US012803626B2

(12) United States Patent
Mei et al.

(10) Patent No.: US 12,803,626 B2
(45) Date of Patent: Nov. 17, 2026

(54) SYSTEMS AND METHODS FOR CODEBOOK CONFIGURATION AND INDICATION

(71) Applicant: ZTE CORPORATION, Shenzhen (CN)

(72) Inventors: Meng Mei, Shenzhen (CN); Chuangxin Jiang, Shenzhen (CN); Bo Gao, Shenzhen (CN); Zhaohua Lu, Shenzhen (CN); Ke Yao, Shenzhen (CN); Yang Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 423 days.

(21) Appl. No.: 18/521,673

(22) Filed: Nov. 28, 2023

(65) Prior Publication Data

US 2024/0162950 A1 May 16, 2024

Related U.S. Application Data

(63) Continuation of application No. PCT/CN2021/118147, filed on Sep. 14, 2021.

(51) Int. Cl.

*H04B 7/0456* (2017.01)
*H04W 8/22* (2009.01)
*H04W 76/20* (2018.01)

(52) U.S. Cl.

CPC ......... *H04B 7/0482* (2013.01); *H04B 7/0486* (2013.01); *H04W 8/22* (2013.01); *H04W 76/20* (2018.02)

(58) Field of Classification Search

CPC ..... H04B 7/0482; H04B 7/0486; H04W 8/22; H04W 76/20

See application file for complete search history.

(56) References Cited

U.S. PATENT DOCUMENTS

| | | | |
|---|---|---|---|
| 2008/0316935 | A1 | 12/2008 | Bala et al. |
| 2015/0103933 | A1 | 4/2015 | Nagata et al. |
| 2017/0041051 | A1 | 2/2017 | Rahman et al. |
| 2020/0412421 | A1 | 12/2020 | Jiang et al. |

FOREIGN PATENT DOCUMENTS

| | | | |
|---|---|---|---|
| CN | 102195691 | A | 9/2011 |
| CN | 103905100 | A | 7/2014 |
| CN | 107872259 | A | 4/2018 |
| CN | 108270472 | A | 7/2018 |
| EP | 3 836 414 | A1 | 6/2021 |

(Continued)

OTHER PUBLICATIONS

Notice of Reasons for Rejection for JP Appl. No. 2023-573375, dated Jan. 28, 2025 (with English translation, 6 pages).

(Continued)

*Primary Examiner* — Brian P Cox

(74) *Attorney, Agent, or Firm* — Foley & Lardner LLP

(57) ABSTRACT

Embodiments of a system, device and method for configuring and indicating a codebook are disclosed. In some aspects, a wireless communication device may receive from a wireless communication node, a signaling, the signaling indicating to use at least two codebook-related factors to generate a first codebook for at least 4 antenna ports. The wireless communication device may generate the first codebook using the at least two codebook-related factors.

18 Claims, 6 Drawing Sheets

500

(56) References Cited

FOREIGN PATENT DOCUMENTS

| | | | | | |
|---|---|---|---|---|---|
| JP | 2015-195608 | A | | 11/2015 | |
| JP | 2021-503732 | A | | 2/2021 | |
| WO | WO-2019173975 | A1 | * | 9/2019 | ............ H04W 72/51 |

OTHER PUBLICATIONS

Partial Supplementary European Search Report for EP App. No. 21956999.9 dated Jan. 22, 2025 (14 pages).
International Search Report and Written Opinion for PCT Appl. No. PCT/CN2021/118147, Mar. 28, 2022 (9 pages).
Extended European Search Report for EP App. No. 21956999.3 dated May 7, 2025 (11 pages).
Communication pursuant to Art. 94(3) EPC for EP Appl. No. 21956999.3 dated Jul. 10, 2026 (7 pages).

* cited by examiner

SYSTEMS AND METHODS FOR CODEBOOK CONFIGURATION AND INDICATION

CROSS-REFERENCE TO RELATED APPLICATION

This application claims the benefit of priority under 35 U.S.C. § 120 as a continuation of PCT Patent Application No. PCT/CN2021/118147, filed on Sep. 14, 2021, the disclosure of which is incorporated herein by reference in its entirety.

TECHNICAL FIELD

The disclosure relates generally to wireless communications and, more particularly, to systems and methods for configuring and/or indicating a codebook.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

Embodiments of a system, device and method for configuring and indicating a codebook are disclosed. In some aspects, a wireless communication method includes receiving, by a wireless communication device from a wireless communication node, a signaling, the signaling indicating to use at least two codebook-related factors to generate a first codebook for at least 4 antenna ports. The method can include generating, by the wireless communication device, the first codebook using the at least two codebook-related factors.

In some embodiments, the at least two codebook-related factors comprises at least one of: a codebook, or an adjustment factor (φ). The codebook may be multiplied by φ to generate the first codebook.

In some embodiments, the codebook comprises at least one of: a codebook for 1 antenna port, a codebook for 2 antenna ports, a codebook for 4 antenna ports, a vector having at least one element with a value of 1, a matrix having at least one element with a value of 1, a diagonal matrix, or a unit matrix.

In some embodiments, the method further includes receiving, by the wireless communication device from the wireless communication node, downlink control information (DCI) comprising P transmit precoding matrix indexes (TPMIs) each indicating a codebook for at least one of: one codebook related factor, one antenna port group, one combination of antenna port groups, wherein P is an integer value.

In some aspects, a wireless communication method includes sending, by a wireless communication node to a wireless communication device, a signaling, the signaling indicating to use at least two codebook-related factors to generate a first codebook for at least 4 antenna ports, and causing the wireless communication device to generate the first codebook using the at least two codebook-related factors.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

A. Network Environment and Computing Environment

Figure 1:
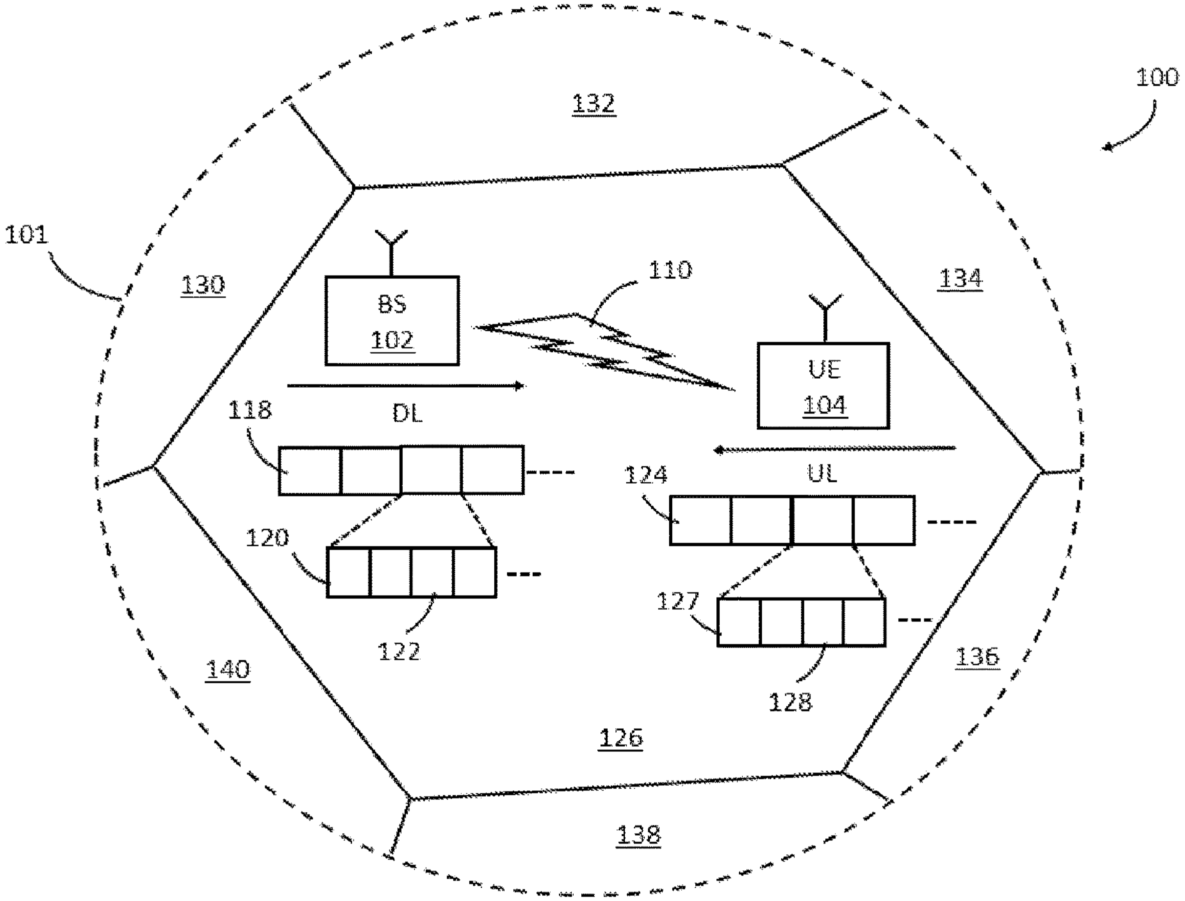
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
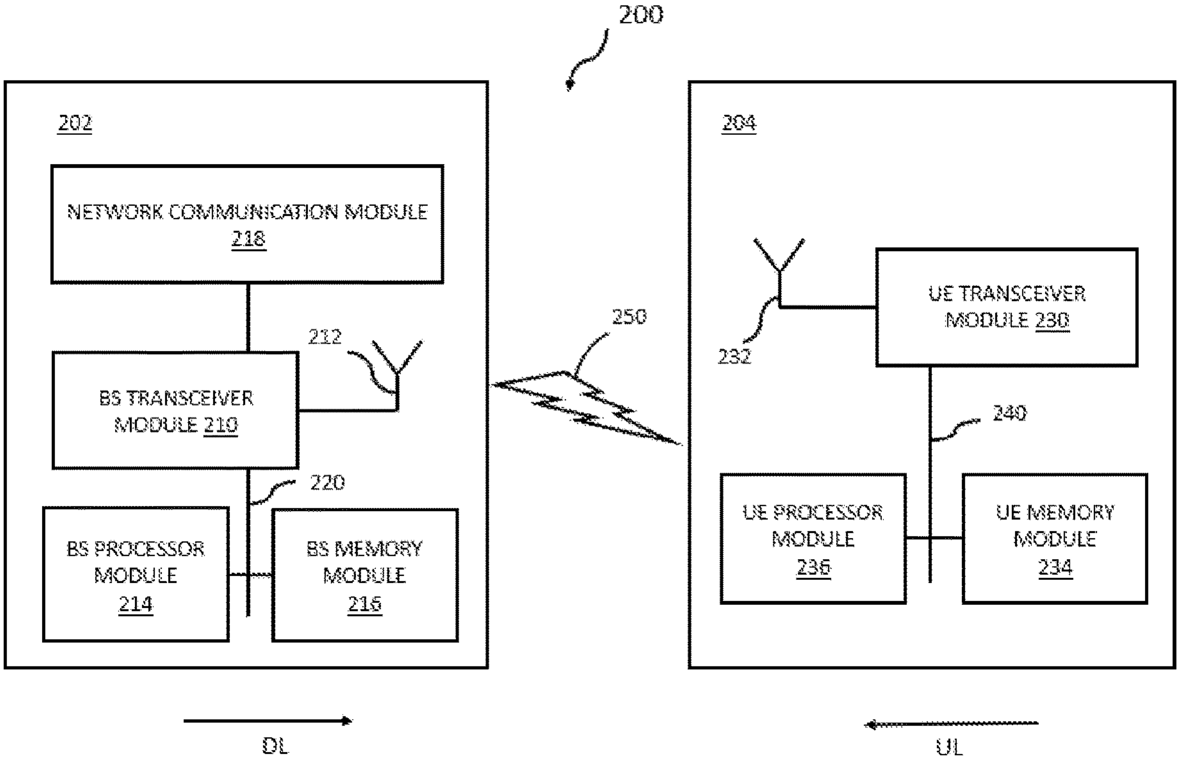
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

B. Codebook Configuration and Indication

In uplink transmission such as codebook-based uplink transmission, up to 4 antenna ports can be supported. If 4 antenna ports are used for the uplink transmission, one or more transmission precoding matrices may be indicated to a user equipment (UE, e.g., the UE 104, the UE 204, a mobile device, a wireless communication device, a terminal, etc.). In some embodiments, a UE receives precoding information, such as an indication of the precoder for uplink transmission in a transmission precoding matrix index (TPMI). The TPMI may be included in signaling (e.g., a downlink control (DCI) field). In some embodiments, a base station (BS, e.g., the BS 102, the BS 202, a next generation NodeB (gNB), an evolved NodeB (eNB), a wireless communication node, a cell tower, a 3GPP radio access device, a non-3GPP radio access device, etc.) transmits the indication of the precoder for uplink transmission to the UE.

The precoder for uplink transmission may be configured among one or more precoders, and the TPMI field in the DCI can indicate which precoder is used. The TPMI field can indicate the rank of the uplink transmission. A precoder with a different antenna coherence scheme/mode can be indicated with a different TPMI. Because certain UEs may support fully coherent, partially coherent, and non-coherent antenna ports, some other UEs may only support partially coherent and non-coherent antenna ports, and yet other UEs may only support non-coherent transmission. Each case can be associated with a different table in the TPMI field.

For an uplink transmission device, more antenna ports (e.g., more than 4, such as 8) can be supported for uplink transmission. Disclosed herein are embodiments of a system and method of how a precoder is designed and indicated for uplink transmission in such cases.

Embodiments of the following disclosure include, but are not limited to the following features. The UE can receive a signal indicating to use at least one codebook (CB)-related factors (TPMI, phi ($\varphi$ or $\phi$), or a smaller codebook) to combine to produce a larger codebook (e.g., for 6 or 8 antenna ports). The UE can use a fully coherent CB to create partially/non-coherent CB. The fully coherent CB can include 8 elements and the UE can deactivate some elements. The UE can use discrete Fourier transform (DFT) processing for instance to create the fully coherent CB (e.g., an 8 antenna port CB).

The UE can combine 2 or more CB factors to generate/output/establish/create one codebook with more antenna ports than the number of elements of any one of the CB factors for instance. Each factor can be one vector that contains one or two or four elements with a value of '1'. Each factor can be one matrix that contains R vectors and each of the R vectors can include one or two or four elements with a value of '1'. In some embodiments, the factors are configured or pre-defined by higher layer (signaling) parameters. In some embodiments, the parameter R indicates the transmitting rank (e.g., number of layers). Each factor can be/include one codebook of 2 antenna ports or 4 antenna ports. In some implementations, each factor is indicated by one TPMI field.

In some embodiments, at least one codebook mode is configured by radio resource control (RRC) signaling or is pre-defined. In some implementations, the codebook mode contains at least one of: 2 factors, 4 antenna ports associated with each factor; 3 factors, 4 antenna ports in the first factor, 2 antenna ports in the second factor, 2 antenna ports in the third factor; 3 factors, 2 antenna ports in the first factor, 4 antenna ports in the second factor, 2 antenna ports in the third factor; 3 factors, 2 antenna ports in the first factor, 2 antenna ports in the second factor, 4 antenna ports in the third factor; or 4 factors, 2 antenna ports in each factor. One codebook mode can be indicated/selected/identified (for use) in the DCI field. In some embodiments, the configured or indicated factor is associated with at least one antenna port index, and the association is indicated by DCI.

In some embodiments, a group of phases is indicated to UE. In some implementations, each phase is associated with the element number of each factor, the number of factors, or an oversampling of the factor. In some embodiments, each factor is associated with one SRS resource set. The TPMI field can indicate a partially coherent codebook associated with one SRS resource set, for instance. A fully coherent codebook can be indicated in the TPMI field if a full power mode of 1 is configured. In some embodiments, a phase parameter is indicated in the case that the full power mode of 1 is configured. In some implementations, the phase parameter is associated with at least one of a distance of the antenna ports, a distance of the antenna panels, or a polarized angle.

For a fully coherent codebook, at least one DFT vector (e.g., vector established/generated via DFT) can be used for the horizontal and/or vertical direction(s). In some embodiments, one group of fully coherent codebooks is configured or pre-defined to the UE, and one codebook in the group is indicated to the UE. In some implementations, for the indication of a codebook, at least one of the following parameters is indicated: the number of antenna ports in horizontal direction, the number of antenna ports in vertical direction, the oversampling parameter in horizontal direction, the oversampling parameter in vertical direction, the phase difference among layers, the phase difference of different polarized antenna port, or the layer number, and can be indicated in one DCI field. In some embodiments, the layer number is indicated by the indication of one dimension of phase difference among layers.

In some embodiments, for partially coherent codebook and non-coherent codebook, at least one mapping indicates that the codebook of at least one element of the fully coherent codebook is reserved. One group of mapping relations can be configured or predefined by RRC signaling. In some implementations, one mapping relation is indicated/selected/specified by DCI (signaling). In some aspects, the transmitting layer is indicated by one dimension of the indicated mapping relation. In some embodiments, one mapping relation is indicated by using a bitmap and each bit indicates whether the codebook of the related mapping factor is reserved. In some embodiments, the mapping factor contains at least one of one antenna port, two antenna ports, four antenna ports, or six antenna ports.

In some embodiments, a base station lists, pre-defines, or configures all the codebooks of 8 antenna ports, and indicates to the UE using the current TPMI field with the indication of rank number. A current/available/existing codebook for 2 or 4 antenna ports can be used to design a codebook for an uplink with 8 antenna ports.

Figure 3A:
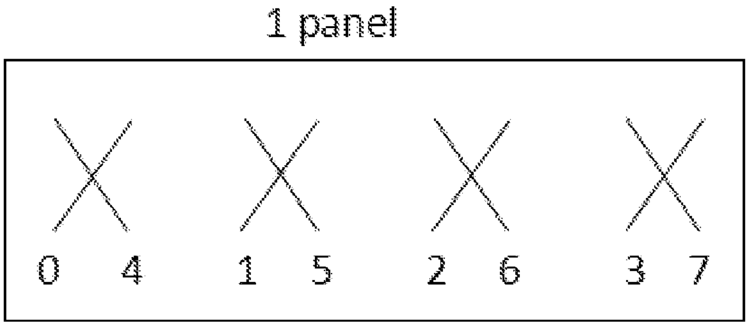
FIGS. 3A-3D illustrate different antenna architectures, in accordance with some embodiments.
Figure 3B:
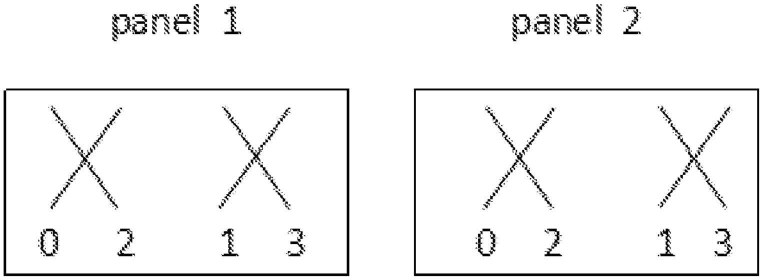
Figure 3C:
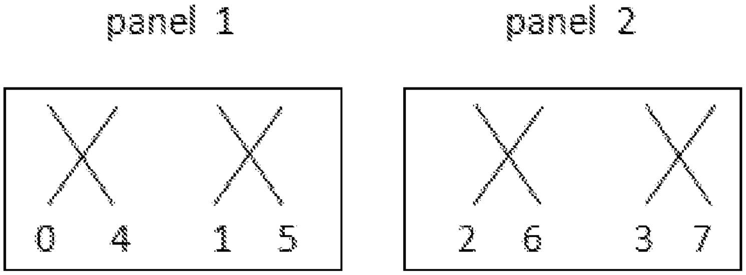
Figure 3D:
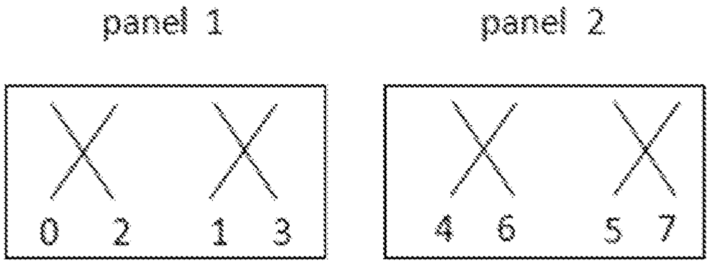
Figure 8:
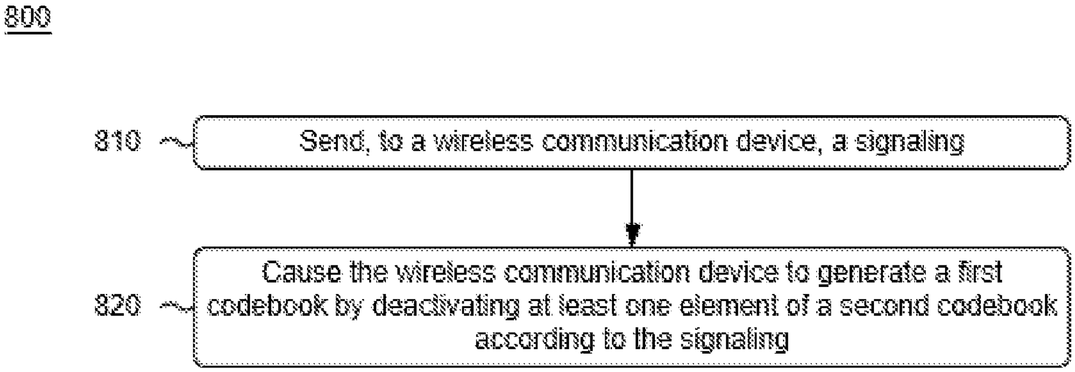
FIG. 8 illustrates a method for sending signaling, in accordance with some embodiments.

FIGS. 3A-3D illustrate different antenna architectures/configurations, in accordance with some embodiments. In the example of FIG. 3A, 8 antenna ports are in/on one panel. The 8 antenna ports may marked as index 0 to 7, in which 4 antenna ports marked as 0 1 2 3 are polarized with the same phase/angle, and 4 antenna ports marked as 4 5 6 7 are polarized with another phase/angle. In the example of FIG. 3B, 8 antenna ports are included in/on two panels, wherein 4 antenna ports are in/on each panel. In some embodiments, the two sets of 4 antenna ports are both marked as ports 0-3, respectively, and are associated with 2 sounding reference signal (SRS) resource sets. In the examples of FIG. 3C-3D, 8 antenna ports are included in two panels, in which 4 antenna ports are in each panel. The 8 ports can be marked with different numbers and can be associated with one SRS resource set.

Antennas may support one or more coherence modes. As defined herein, fully coherent antennas are those in which all antenna ports (concurrently) used or not, partially coherent antennas are those in which some groups of antennas are either (concurrently) used or not used, and non-coherent antennas are those that can use or not use any individual antenna.

For a codebook of 8 antenna ports, one element, vector quantity, or matrix can be multiplied with the 4 antenna ports codebook or 2 antenna ports codebook, and then be combined with one of a current/available4 antenna ports codebook or 2 antenna ports codebook, to design an 8 antenna ports codebook. For example, one of the current 4 antenna ports codebook is {1,1,j,j}, the codebook of 4 antenna ports can be mapped on the different polarized antenna ports of an 8-antenna-port transmission by default, e.g., one 4 antenna ports codebook is mapped to ports {0,4,2,6} and to ports {1,5,3,7} and the 8 antenna ports codebook is {1,1,1,1,j,j,j,j}. In some examples, the codebook of 8 antenna ports can be combined with any two of the fully coherent codebooks of 4 antenna ports, where one fully coherent codebook of 4 antenna ports is mapped on one set of polarized antenna ports and the same or another fully coherent codebook of 4 antenna ports is mapped on the other polarized antenna ports. If the second 4 antenna ports codebook is multiplied with one vector, this can be used to create new codebooks for 8 antenna ports.

Figure 4A:
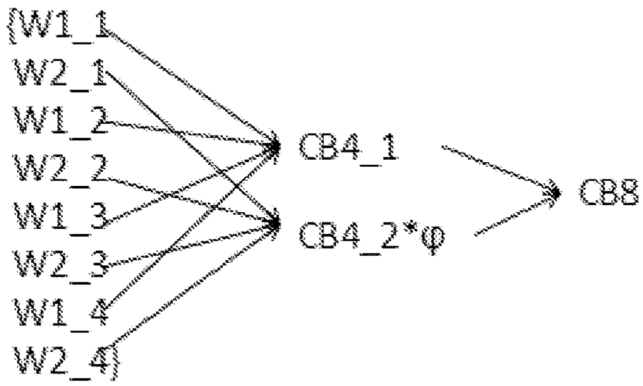
FIGS. 4A-4D illustrate codebooks being combined from other codebooks, in accordance with some embodiments.
Figure 4B:
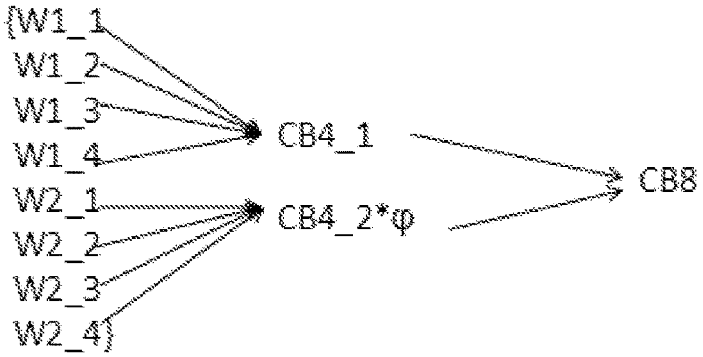
Figure 4C:
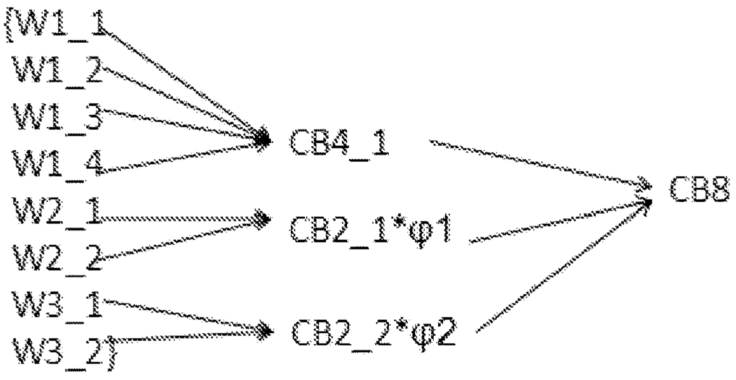
Figure 4D:
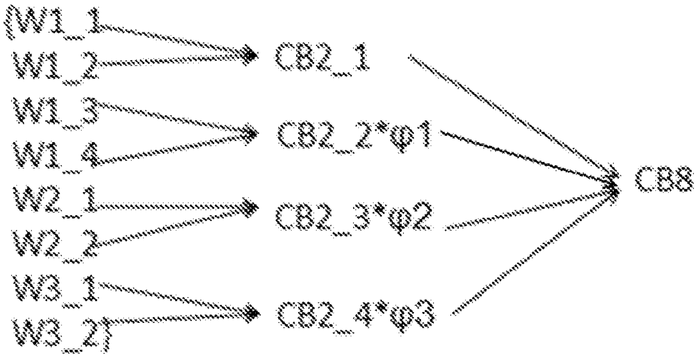

FIGS. 4A-4D illustrate codebooks being combined from other codebooks, in accordance with some embodiments. In some implementations, the value of the element, vector quantity, or matrix is calculated by a discrete Fourier transform (DFT) of a vector, and each element multiplies with one DFT element. In the example of FIG. 4A, each of CB4_1 and CB4_2 is a codebook of 4 antenna ports, the phase φ is an element or a vector or a matrix multiplied with CB_4, and the two codebooks of 4 antenna ports are combined into an 8 antenna ports codebook. φ Phi (for adjustment) can be an element (e.g., a "j" element/value), a vector, or a matrix. The example of FIG. 4B illustrates another example of the two codebooks of 4 antenna ports being combined into an 8 antenna ports codebook The codebook of 8 antenna ports can be a combination of the codebooks of 4 antenna ports and 2 antenna ports. In the example of FIG. 4C, CB4_1 is a codebook of 4 antenna ports, each of CB2_1 and CB2_2 is a codebook of 2 antenna ports, and each of φ1 and φ2 is a phase element, vector quantity, or matrix, e.g., a DFT vector (e.g., vector generated/calculated using/via DFT). In the example of FIG. 4D, CB2_1, CB2_2, CB2_3, and CB2_4 are codebooks of 2 antenna ports and φ1,φ2, and φ3 are phase elements, vector quantities, or matrices, e.g. a DFT vector.

For use in the creation/design of an 8 antenna ports coherent codebook, all of the codebooks of 4 antenna ports, 2 antenna ports, or 1 antenna port can be coherent codebooks. In some embodiments, for use in the creation/design of a partially coherent codebook, some antenna ports are used for the uplink transmission, and other antenna ports are not used for the uplink transmission, so the partially coherent codebook can also be combined from 4, 2, or 1 antenna ports codebooks as shown in FIGS. 4A-4D. For a partially coherent codebook for 8 antenna ports, a group of antenna ports are coherent and the other antenna ports may belong to another coherent group. In some aspects, for a partially coherent codebook, at least one group of coherent antenna ports is used for the uplink transmission and other antenna ports are not used, e.g., the element of the codebook associated with these antenna ports is marked as 0. In the examples of FIGS. 4A-4B, two codebooks of 4 antenna ports are combined to be one 8 antenna ports codebook.

Disclosed herein are several methods to design a partially coherent codebook of 8 antenna ports. In some embodiments, only one fully coherent codebook of 4 antenna ports is used (to generate the partially coherent codebook of 8 antenna ports), and the other codebooks are partially coherent. In some examples, if CB4_1 is one fully coherent codebook of 4 antenna ports, CB4_2 has 0 for all the elements (so as to be disabled). For the indication of the codebook of 8 antenna ports, in some aspects, the codebooks are listed (or configured via RRC signaling), and TPMI field in the DCI can indicate the specific codebook to be used/selected for uplink transmission, while another way is to indicate which codebook of 4 antenna ports is used as the partially coherent codebook of 8 transmission antenna ports.

In some implementations, two partially coherent codebook of 4 antenna ports can be combined as one partially coherent codebook of 8 antenna ports. Two partially coherent codebook can be from CB4_1 and CB4_2. CB4_2 can be the codebook from the current specification without any change, or can be multiplied with one element, vector quantity, or matrix to change the phase of the element of the 4 antenna ports codebook.

Some embodiments include a combination of codebooks of 4 antenna ports and/or 2 antenna ports. Similar to above methods, at least one of the codebook of 4 antenna ports or 2 antenna ports is the partially coherent codebook.

For non-coherent codebook, one of the combined codebook of 4 antenna port or 2 antenna port can be non-coherent. The codebook for more layers can be combined with the same layer of a 4 antenna port codebook or a 2 antenna port codebook.

For the codebook indication, if all the 8 antenna ports codebook can be listed, pre-defined, or configured, the TPMI field can indicate/select the codebook of 8 antenna ports (to use for precoding of signals for transmission, by the UE for instance). If the number of codebooks for 8 antenna ports is larger than 4 antenna ports and 2 antenna ports for the combination of these codebooks, more bits may be used for the TPMI indication. The rank number can be indicated with the precoder by using the TPMI field because the codebook can contain the rank information/number. The rank number can be indicated independently in some implementations. That is, a rank indicator (RI), which indicates a rank number, can be separated from TPMI if the RI is applied for all the codebooks. There can be an additional field for the rank indication with 2 or 3 bits. In some embodiments, if up to 4 layers are supported, 2 bits are sufficient, but if the rank number or the demodulation reference signal (DMRS) ports number is configured to be supported up to 8, 3 bits are then used to represent this. The current codebook of 4 antenna ports and 2 antenna ports can be used for the indication of codebook of 8 antenna ports.

In the case of 4 antenna ports, multiple (e.g., two) TPMI fields can indicate codebooks (e.g., the codebooks of CB4_1 and CB4_2). The rank number (e.g., the number of layers) can be indicated in the TPMI field. Phi can be indicated via DCI (e.g., for each layer, or for all layers, at least one element for at least one layer). In some implementations, the codebook of each (group of) 4 antenna ports indicates the codebook with the same transmission layer such that the second TPMI field can indicate the rank number with the codebook. In some embodiments, the second TPMI field only indicates the codebook having the same layer number with the second TPMI field. A new field can indicate $\varphi$. For more layers transmission, the same $\varphi$ (the one value from $\{1, j, -1, -j\}$ or the whole vector with different combinations of the four values) can be used for all the layers.

If the codebook of 8 antenna ports can be combined not only from 2 codebooks of 4 antenna ports, but also can be combined from codebooks of 2 antenna ports, then up to 4 TPMI fields can be indicated in the DCI field to indicate the codebook of 2 antenna ports or the codebook of 4 antenna ports.

Whether the UE supports a 2 antenna ports codebook and/or a 4 antenna ports codebook can be based on UE capability. For example, if the UE reports the capability of supporting codebook of 4 antenna ports (e.g., the 4 antenna ports are coherent), the UE can support the codebook of 4 antenna ports+4 antenna ports, 4 antenna ports+2 antenna ports+2 antenna ports, 2 antenna ports+4 antenna ports+2 antenna ports, 2 antenna ports+2 antenna ports+4 antenna ports, and 2 antenna ports+2 antenna ports+2 antenna ports+2 antenna ports. In an example, if the UE reports a capability of the UE supporting codebooks of 2 antenna ports (all the antenna ports are coherent with 2 antenna ports), the UE can support the codebook of 2 antenna ports+2 antenna ports+2 antenna ports+2 antenna ports.

In the case of codebooks with different antenna ports, the TPMI field may indicate that a codebook is for 2 antenna ports or 4 antenna ports. In some embodiments, whether the codebook is for 2 antenna ports or 4 antenna ports is indicated. The codebook for the case of 4+4, 4+2+2, 2+4+2, 2+2+4, or 2+2+2+2 can be configured in the radio resource control (RRC) signaling. 3 bits can indicate which mode is used, and each of the one or more TPMIs indicates a codebook of 4 antenna ports or a codebook of 2 antenna ports.

If the UE reports the (UE) capability (e.g., of support a certain number of TPMI fields), the gNB can indicate the codebook(s) with several TPMI fields. In some embodiments, only the number of TPMI fields that is supported by the UE capability is indicated in the DCI field. For example the UE supports coherent antenna ports of 4 antenna ports, so two TPMI fields can indicate the codebook of the two coherent 4 antenna ports.

In some embodiments, up to 4 TPMI fields are indicated in the DCI field. In some implementations, only the former/first number of TPMI fields can indicate the TPMI, which is the same as the codebook mode indicated by the DCI signaling. For example, if the DCI indicates the codebook is combined from 2 codebook of 4 antenna ports, the first and the second TPMI fields can be used, and the other TPMI fields can be ignored or dropped.

A similar method can be achieved for 4 antenna ports codebook and a 6 port antenna ports codebook. For the codebook of 4 antenna ports, two TPMI fields can indicate a codebook of 2 antenna ports in each TPMI field. For a codebook of 6 antenna ports, two or three TPMI fields can indicate the codebook. For two TPMI fields, one TPMI field can indicate a codebook of 2 antenna ports, and the other TPMI field can indicate a codebook of 4 antenna ports. For 3 TPMI fields, a codebook of 2 antenna ports can be indicated in each TPMI field.

For the indication of partial or non-coherent codebook, if at least one TPMI field is deactivated, (a) the entry of the TPMI field can indicate whether the TPMI is deactivated or not, (b) at least one new bit can indicate each TPMI is deactivated or not, and one bit can be associated with one TPMI field, or (c) at least one new bit may indicate which one or more of the TPMI fields are deactivated. For example, if a codebook of 8 antenna ports is combined from two codebooks of 4 antenna port, one bit can indicate which TPMI is used to indicate the codebook. For more codebooks of 4 antenna ports or 2 antenna ports, more bits can be used. The rank number can be indicated by the first TPMI field or by one new field in DCI.

Disclosed herein are embodiments of codebook factors, wherein one or more codebook factors can combine to establish/generate one codebook of 8 antenna ports. The factors can be a vector or a matrix. For the factors different from the current codebook of 2 antenna ports and 4 antenna ports, all of the elements may be 1. If more factors are to be combined, some of the factors may be multiplied by one DFT vector, and the phase of the factors are changed.

For a factor containing 4 elements, in which all of the elements are 1 (e.g., {1, 1, 1, 1} as a row vector), two of the factors can be combined as one codebook of 8 antenna ports. In some embodiments, each factor is mapped on one group of coherent 4 antenna ports and one factor can be multiplied by an element or a vector, e.g., a DFT vector. Without being multiplied by the element or vector, two factors containing 4 elements can form one codebook of 8 antenna port such as {1, 1, 1, 1, 1, 1, 1, 1}. In some embodiments, if one element is multiplied by one of the factor as 'j', the codebook is {1, 1, 1, 1, j, j, j, j}, and the other value should also be considered, e.g., –j,–1, etc. If one vector is multiplied by one factor, the vector can be a DFT vector (e.g., the vector is calculated via DFT). If the element of the antenna port can be mapped on the horizontal and vertical, then the DFT vector can be calculated based on the antenna number of each direction. For a more elaborate codebook, each of the vectors can be calculated based on one oversampling factor for each direction.

For example, given that the factor with 4 elements is marked as B1 (e.g., indicated by DCI; candidates for B1 configured by RRC) and the value or vector for phase changing is marked as φ, disclosed herein are various codebooks for 8 antenna ports. For a fully coherent codebook, $$\begin{Bmatrix} B1 \\ \varphi * B1 \end{Bmatrix} \text{ or } \begin{Bmatrix} \varphi1 * B1 \\ \varphi2 * B1 \end{Bmatrix}$$

can be used as the codebook of 8 antenna ports, wherein the parameters φ, φ1, φ2 are one value or vector. For a partially coherent codebook, one B1 can be used as partially coherent codebook as $$\begin{Bmatrix} B1 \\ 0 \end{Bmatrix}, \begin{Bmatrix} \varphi * B1 \\ 0 \end{Bmatrix}, \begin{Bmatrix} 0 \\ \varphi * B1 \end{Bmatrix}, \text{ or } \begin{Bmatrix} 0 \\ B1 \end{Bmatrix}.$$

For a non-coherent codebook, one B1 with only one element set to '1' can be used as the one of the non-coherent codebook of 8 antenna ports. The factor can be a vector or matrix with only 2 elements which are associated with 2 antenna ports.

A similar method can be used for a factor with 4 elements. For a fully coherent $$\begin{Bmatrix} B1 \\ \varphi1 * B1 \\ \varphi2 * B1 \\ \varphi3 * B1 \end{Bmatrix} \text{ or } \begin{Bmatrix} \varphi * B1 \\ \varphi1 * B1 \\ \varphi2 * B1 \\ \varphi3 * B1 \end{Bmatrix}$$

codebook, can be used as the codebook of 8 antenna ports, wherein the parameters φ, φ1, φ2 is one value or vector. For a partially coherent codebook, one B1 can be used as a partially coherent codebook as $$\begin{Bmatrix} \varphi * B1 \\ 0 \\ 0 \\ 0 \end{Bmatrix}, \begin{Bmatrix} 0 \\ \varphi * B1 \\ 0 \\ 0 \end{Bmatrix}, \begin{Bmatrix} 0 \\ 0 \\ \varphi * B1 \\ 0 \end{Bmatrix}, \text{ or } \begin{Bmatrix} 0 \\ 0 \\ 0 \\ \varphi * B1 \end{Bmatrix}.$$

Similarly, two or three factors of B1 can be combined for one codebook of 8 antenna ports. For example $$\begin{Bmatrix} \varphi1 * B1 \\ 0 \\ \varphi2 * B1 \\ 0 \end{Bmatrix}, \begin{Bmatrix} \varphi1 * B1 \\ \varphi2 * B1 \\ 0 \\ 0 \end{Bmatrix}, \begin{Bmatrix} \varphi1 * B1 \\ \varphi2 * B1 \\ \varphi3 * B1 \\ 0 \end{Bmatrix}$$

and some other combinations with 2 or 3 factors. For a non-coherent codebook, one B1 with only one element set to '1' can be used as the one of the non-coherent codebook of 8 antenna ports.

More factors can also be used to form one codebook of 8 antenna ports, e.g., different factors are mapped on different elements of the codebook of 8 antenna ports, e.g., different factors are associated with different antenna ports.

If more factors are configured by RRC or pre-defined, e.g., B1, B2, B3, B4, these different factors can be used in one codebook, for example, $$\begin{Bmatrix} B1 \\ \varphi1 * B2 \\ \varphi2 * B3 \\ \varphi3 * B4 \end{Bmatrix}, \begin{Bmatrix} \varphi1 * B1 \\ 0 \\ \varphi2 * B2 \\ 0 \end{Bmatrix}, \begin{Bmatrix} \varphi1 * B1 \\ \varphi2 * B2 \\ \varphi3 * B3 \\ 0 \end{Bmatrix},$$

and similarly other combinations.

Different numbers of elements can be contained in different factors. For example, B1 contains 2 elements and B2 contains 4 elements, and B3 contains 6 elements. Different factors can be indicated to the UE by DCI, and the codebook can be combined as $$\begin{Bmatrix} \varphi1 * B1 \\ \varphi2 * B3 \end{Bmatrix}, \begin{Bmatrix} \varphi1 * B1 \\ \varphi2 * B1 \\ \varphi3 * B2 \end{Bmatrix},$$

or other combinations. In some embodiments, if all the configured/available codebooks (e.g., factors B1, B2, B3, . . . ) are listed and the UE knows/determines/detects all the codebooks, then only one indication (e.g., via DCI) can indicate to the UE the codebook for UL transmission.

For the indication of codebook without the codebook of 8 antenna ports listed/provided to the UE, the factor B1 or other factors (e.g., Bn) can be configured or pre-defined to the UE, wherein the factors can be one vector with 1, 2, or 4 elements of '1', or a matrix with N1 vectors, and each vector contains 1, 2, or 4 elements of '1', and N1 is associated with the layer number. In some aspects, if the factors are configured by higher layer or pre-defined, then φ is indicated to the UE. The rank number can be indicated to the UE independently such that the UE knows the dimension of φ. For example, if the rank field indicates the transmission layer is 2 and the configured factor contains 4 elements, then φ can be indicated as $$\left\{\begin{matrix} \varphi_{1-1}\varphi_{2-1} \\ \varphi_{1-2}\varphi_{2-2} \end{matrix}\right\},$$

wherein each φ is a group of values or vectors configured or pre-defined, and DCI indicates these indexes of φ (to be used/applied). For a partially coherent codebook and a non-coherent codebook, the configured or indicated factors may be indicated to be associated with at least one antenna port index, such that the UE knows which antenna ports are used to indicate the codebook. Similar methods can be used for a 4 antenna ports codebook and 6 antenna ports codebook.

The factor B can be a vector having at least one element with a value of 1, a matrix having at least one element with a value of 1, or a diagonal matrix. So, if only one elements is activated as 1 or another non-zero value in each vector, the vector or the diagonal can be treated as one non-coherent codebook. If more than 1 value is activated as 1 or other non-zero values in the vector or one vector of the matrix, the vector or the matrix can be treated as partially coherent codebook. If all the values are one or other non-zero values, the element or the vector or the matrix can be treated as fully coherent codebook. The elements in one vector or each vector in one matrix can be 1, 2, 4, or 6, and each of the elements is associated with one antenna port. In some implementations, the row number in the matrix is the same as, or associated with, the rank number. In some aspects, the unit matrix includes only one element with a non-zero value in one vector or a row.

In some embodiments, to determine the size of a coherent codebook, the UE reports the capability of at least one of a number of coherent antenna ports in one antenna port group, a number of antenna port groups, indexes of the antenna ports, indexes of antenna port groups, or a rank number in each antenna port group. One antenna port group may include one or more coherent antenna ports. The combination of antenna port groups can include at least one antenna port group. In some implementations, the UE reports the capability of a rank number in each antenna port group, meaning if one codebook associated with this antenna port group, then the rank of the codebook, or the codebook-related factor is not configured or indicated with more ranks than the reported rank number of this antenna port group. In some aspects, the combination of at least one antenna port groups allows the gNB to indicate or configure one codebook for one combination.

Some embodiments use downlink information to perform DFT calculation. In some implementations, some of the codebooks of 8 antenna ports can be calculated from DFT vectors from horizontal and/or vertical direction(s).

The DFT vector are shown as follows:

$$u_1 \in \left\{ \begin{bmatrix} 1 \\ e^{j\frac{2\pi n_1}{N_1 O_1}} \\ \vdots \\ e^{j\frac{2\pi n_1 (N_1-1)}{N_1 O_1}} \end{bmatrix}, n_1 = 0, 1, \ldots N_1 O_1 - 1 \right\}$$

$$v_1 \in \left\{ \begin{bmatrix} 1 \\ e^{j\frac{2\pi n_2}{N_2 O_2}} \\ \vdots \\ e^{j\frac{2\pi n_2 (N_2-1)}{N_2 O_2}} \end{bmatrix}, n_2 = 0, 1, \ldots N_2 O_2 - 1 \right\}$$

The vectors of $u_1$ and $v_1$ are the DFT vectors from the two dimensions, respectively. N1, N2 are the numbers of the antenna ports and O1 and O2 are the oversampling factor of these two dimensions, respectively.

From the above formula, the fully coherent codebook can be achieved with another parameter of φ which is the phase of the two groups of antenna ports, wherein each group of antenna ports is associated with one polarized direction.

The fully coherent codebook generated by DFT vector for one layer can be shown as follows:

| 1 | 2 | 3 | 4 | 5 | 6 | 7 | 8 | index |
|---|---|---|---|---|---|---|---|---|
| 1 | 1 | 1 | 1 | 1 | 1 | 1 | 1 | codebook |
| 1 | 1 | 1 | 1 | j | j | j | j | |
| 1 | 1 | 1 | 1 | −1 | −1 | −1 | −1 | |
| 1 | 1 | 1 | 1 | −j | −j | −j | −j | |
| 1 | j | −j | −1 | 1 | j | −j | −1 | |
| 1 | j | −j | −1 | j | −1 | 1 | −j | |
| 1 | j | −j | −1 | −1 | −j | j | 1 | |
| 1 | j | −j | −1 | −j | 1 | −1 | j | |

| 9 | 10 | 11 | 12 | 13 | 14 | 15 | 16 | index |
|---|---|---|---|---|---|---|---|---|
| 1 | 1 | 1 | 1 | 1 | 1 | 1 | 1 | codebook |
| −1 | −1 | −1 | −1 | −j | −j | −j | −j | |
| 1 | 1 | 1 | 1 | −1 | −1 | −1 | −1 | |
| −1 | −1 | −1 | −1 | j | j | j | j | |
| 1 | j | −j | −1 | 1 | j | −j | −1 | |
| −1 | −j | j | 1 | −j | 1 | −1 | j | |
| 1 | j | −j | −1 | −1 | −j | j | 1 | |
| −1 | −j | j | 1 | j | −1 | 1 | −j | |

Similarly, for other layers, the codebook of full coherent type can be calculated based on the above formula.

The full coherent codebooks can be listed/configured to the UE. It can be indicated to the UE which of the full coherent codebooks is to be used for uplink transmission, or the parameters O1, O2, and φ can be indicated to the UE for calculating the full coherent codebook.

One method to achieve the partially coherent codebook or non-coherent codebook is by setting some elements of the full coherent codebook to '0'. In some aspects, which elements are set to '0', or which elements are not set to '1' is based on the UE capability of the antenna ports. For example, in FIG. 3A, if the antenna ports {0 4 2 6} are coherent, and the other four antenna ports are coherent, for a partially coherent codebook, one group of the coherent antenna ports is maintained and the other group of coherent antenna ports are set to '0'. For one layer transmission, one bit can indicate which group of coherent antenna ports are set to '0'.

Which coherent antenna ports are set to '0' can be indicated in various ways. In some embodiments, RRC configures several vectors containing the configuration of which group of antenna ports are set to '0'. For example, if value 0 indicates that the first group of coherent antenna ports is set to '0' and value 1 indicates that the second group of coherent antenna ports is set to '0', then, for one layer transmission, {0}{1} can be configured (for each group of antenna ports), for 2 layers, {0,0},{0,1},{1,0},{1,1} is configured (for each group of antenna ports), etc. The similar rule can be configured for more layers, up to 8 layers. All the parameters can be configured and DCI can indicate which parameter is used/selected. According to this indication, the number of layers can also be indicated. The configured vector or matrix can also be associated with each antenna port. For example, for the codebook of 8 antenna ports, if one vector is configured as {1 0 1 0 1 0 1 0}, and this vector is indicated to the UE, the UE knows which elements of the codebook is punched/deactivated. If the one coherent codebook is indicated as {1 1 1 1 j j j j}, e.g., in the TPMI field with index 2, and according to the indication of the configured vector, the codebook can be {1 0 1 0 j 0 j 0}. In some embodiments, if one matrix is configured, the rank number information is contained in this configured matrix, so the rank information can be achieved from the indicated fully coherent codebook or the indicated matrix. Each element in the RRC configured vector or matrix can be associated with one antenna port or one group of antenna ports (one coherent antenna ports) or one combination of antenna port groups.

In some embodiments, a bitmap can be used to configure or indicate the partially coherent codebook. If the maximum number of layers is M, then for the combination of two codebooks of 4 antenna ports or two coherent antenna ports groups, one bit can indicate which codebook (or group of antenna ports) is set to '0' for one layer, so up to M bits can be used and each bit is mapped to one layer.

In some embodiments, another parameter (e.g., RRC parameter) is set to indicate the number of layers as R, so that if the bitmap contains M bits, only the former/first R bits indicates for which groups of antenna ports or codebook that '0' is set. The number of bits in the bitmap can be indicated, which is the same as the number of layers, and only R bits are used for the bitmap, and the partially coherent codebook can be indicated for these R layers by using this bitmap. Each bit can be associated with one antenna port or one group of antenna ports one coherent set of antenna ports).

For the case of a codebook of 8 antenna ports that contains 4 groups of coherent antenna ports, e.g., {0,4},{1,5},{2,6}, {3,7}, a similar method can be used. Examples of groups of coherent antenna ports associated with 8 antenna ports are: 4 antenna ports+2 antenna ports+2 antenna ports, 2 antenna ports+4 antenna ports+2 antenna ports, 2 antenna ports+2 antenna ports+4 antenna ports, and 2 antenna ports+2 antenna ports+2 antenna ports+2 antenna ports.

In some embodiments, each element in the RRC configured vector or matrix, or each bit in the bitmap is associated with one group of coherent antenna ports. In some aspects, for a non-coherent codebook, one antenna port is indicated for generating the codebook, so the element in the configured vector or the bit in the bitmap is associated with one antenna port, and only one element is activated to generate the non-coherent codebook.

For more layers transmission, the fully coherent codebook can be calculated according to the DFT vector of horizontal and vertical dimension and the phase difference of different polarized antenna ports and the phase difference of different transmission layers. The fully coherent codebook and the partially coherent codebook can be indicated to UE by using the TPMI field.

In some embodiments, for the case of two groups of antenna ports as shown in FIG. 3B, each group of antenna ports is associated with one SRS resource set, so the codebook of each group of antenna ports can be indicated independently for uplink transmission, and two TPMI fields can indicate the codebook of each group of antenna ports. In some implementations, if more than two layers are indicated for the uplink transmission, each SRS resource set is associated with one uplink transmission. In some embodiments, the two uplink transmissions are separated and different layers are transmitted by using one group of antenna ports with one indicated TPMI.

In some aspects, for transmission on only one of two panels, one TPMI field is indicated for the uplink transmission, and the other TPMI field is disabled. In some implementations, one entry in each TPMI field is used to indicate if the corresponding TPMI field is disabled.

In some embodiments, one TPMI field indicates the codebook of the two groups of antenna ports associated with different SRS resource sets. The TPMI field can indicate the codebook designed based on 8 antenna ports. In some implementations, each group of antenna ports (one panel) is associated with one group of coherent antenna port, e.g., panel 1 is associated with antenna ports {0,4,2,6}, and panel 2 is associated with {1,5,3,7}. In some aspects, each partially coherent codebook is associated with one panel, so if one codebook is selected, the panel is selected. In other words, in some embodiments, the UE receives two factors and drops one if the codebook is a partially coherent codebook.

In some embodiments, for a full power uplink transmission, a full coherent codebook is designed. In some implementations, if the full power mode is configured by a higher layer, the full coherent codebook is indicated to the UE, and the UE can transmit by using the two panels.

For the case of two groups of antenna ports as shown in FIG. 3C, two groups of antenna ports are associated with one SRS resource set, so the codebook of each group of antenna ports can be indicated by one TPMI.

For the fully/full coherent codebook, the antenna ports may be from different panels, in which case the phase of different panels can be considered. In some aspects, if the codebook of 8 antenna ports are from one factor with 1, 2, or 4 elements, each element is configured as 1, or the factor is one codebook of 4 antenna ports. In some implementations, the phase is multiplied by one of the factors.

In some embodiments, if the codebook is designed from one group of fully coherent codebook of 8 antenna ports with a DFT vector, two phases are considered. In some implementations, one of the phases is the phase of different polarized antenna ports, and another phase is the phase difference of the two panels. In some embodiments, this phase is associated with the distance of these two panels and the polarized angle of each antenna port.

Figure 5:
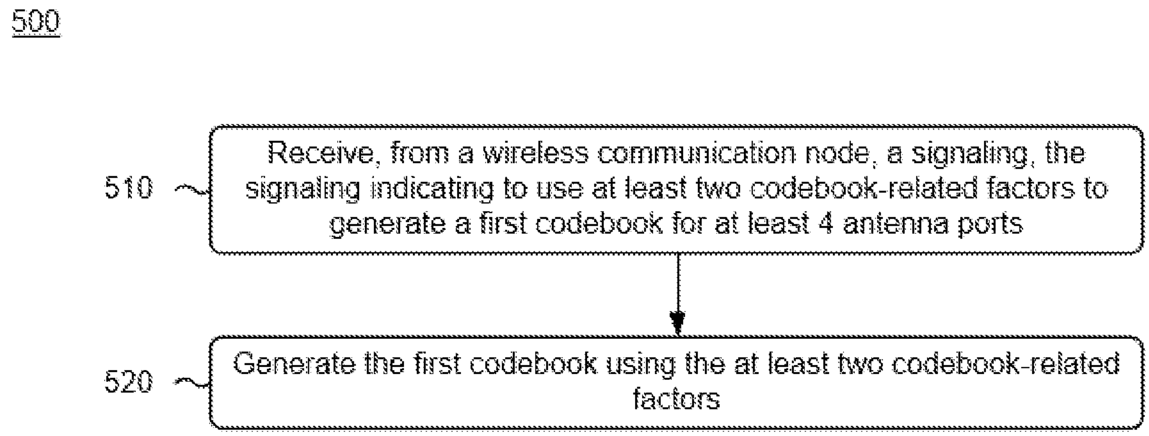
FIG. 5 illustrates a method for generating a codebook using codebook-related factors, in accordance with some embodiments.

FIG. 5 illustrates a method 500 for generating a codebook using codebook-related factors, in accordance with some embodiments. Referring to FIGS. 1-4, the method 500 can be performed by a wireless communication device (e.g., a UE) and/or a wireless communication node (e.g., base station, a gNB), in some embodiments. Additional, fewer, or different operations may be performed in the method 500 depending on the embodiment.

In brief overview, in some embodiments, a wireless communication device receives, from a wireless communication node, a signaling, the signaling indicating to use at least two codebook-related factors to generate a first codebook for at least 4 antenna ports (operation 510). In some embodiments, the wireless communication device generates the first codebook using the at least two codebook-related factors (operation 520).

In more detail, at operation 510, in some embodiments, a wireless communication device receives, from a wireless communication node, a signaling, the signaling indicating to use at least two codebook-related factors to generate a first codebook for at least 4 antenna ports (e.g., 8 antenna ports). In some embodiments, the wireless communication device is a UE and the wireless communication node is a base station. In some embodiments, the signaling is RRC signaling. For example, the codebook for the each of the cases of 4+4, 4+2+2, 2+4+2, 2+2+4, and 2+2+2+2 can be configured in the RRC signaling, 3 bits can be used to indicate which mode is used, and the TPMI (e.g., each TPMI) indicates the codebook of 4 antenna ports or 2 antenna ports.

In some embodiments, the at least two codebook-related factors includes at least one of a codebook, or an adjustment factor (phi, also referred to as φ or φ). In some embodiments, the codebook is multiplied by φ to generate the first codebook. In some implementations, φ includes a vector, a matrix, or a real, imaginary or complex number (e.g., an element). In some embodiments, φ is associated with at least one of one antenna port, one codebook related factor, or rank number. In some implementations, the adjustment factor is zero. For example, the adjustment factor is zero for one element, vector quantity, or matrix that is to be multiplied with a 2 or 4 antenna port antenna.

In some embodiments, the wireless communication device determines the at least two codebook-related factors to generate the first codebook according to a predefined configuration or a higher layer signaling (e.g., DCI) from the wireless communication node. In some embodiments, different factors can be indicated to the UE by DCI. If all the codebooks (e.g., factors B1, B2, B3 . . . ) are listed/configured to the UE, and the UE knows/determines all the codebooks, then one indication (via DCI) can be used to indicate to the UE the codebook for UL transmission. In some implementations, one codebook related factor is deactivated by: at least one entry in a transmit precoding matrix index (TPMI) field, or at least one bit in a downlink control information (DCI) signaling.

At operation 520, in some embodiments, the wireless communication device generates the first codebook using the at least two codebook-related factors. In some embodiments, the codebook includes at least one of a codebook for 1 antenna port, a codebook for 2 antenna ports, a codebook for 4 antenna ports, a vector having at least one element with a value of 1, a matrix having at least one element with a value of 1, a diagonal matrix, or a unit matrix.

In some implementations, the codebook includes at least one rank and includes N elements in each rank (e.g., the number of elements of one vector of the codebook). In some embodiments, the codebook includes at least one of a type A codebook, wherein none of elements of the codebook is '0'; a type B codebook, wherein N−1 elements of the codebook is '0'; or a type C codebook, wherein M elements of the codebook is '0'; wherein N is an integer value greater than 0, and M is an integer value greater than 1 and smaller than N. In some examples, if the codebook is for one layer {1 0 0 0} is a non-coherent codebook, for one codebook of more layers, e.g., 2 layers {1 0 0 0; 0 1 0 0}, the codebook is also one non-coherent codebook.

In some embodiments, if the first codebook of H elements is a type C codebook, the first codebook is generated using only a type A codebook for K antenna ports, two type C codebooks for K antenna ports, at least one type C codebook for L or K antenna ports, at least one type A codebook for L or K antenna ports, or at least two type B codebooks for L or K antenna ports. For example, for 2+2+4, take the 2+2 as two full coherent codebooks or take 2+4 as two full coherent codebooks.

In some implementations, if the first codebook of H elements is a type B codebook, the first codebook is generated using only one type B codebook for K antenna ports. For example, for non-coherent codebooks, one of the combined codebooks of 4 antenna ports or 2 antenna ports is non-coherent. In some embodiments, if the first codebook of H elements is a type A codebook, the first codebook is generated using only type A codebooks each for K antenna ports. For example, for 8 antenna ports coherent codebook, all of the codebooks of 4 antenna ports, 2 antenna ports, or 1 antenna port is a coherent codebook. In some embodiments, at least one of: H, L, and K are each a number of elements in each rank of the corresponding codebook, and are each a respective integer value, where L and K are each smaller than H; H is one value of 2, 4, 6, or 8 in each rank; or L and K are each at least one value of 1, 2, 4, or 6 in each rank.

In some embodiments, the wireless communication device receives, from the wireless communication node, downlink control information (DCI) including P transmit precoding matrix indexes (TPMIs) each indicating a codebook for at least one of: one codebook related factor, one antenna port group, one combination of antenna port groups, wherein P is an integer value In some embodiments, the wireless communication device sends, to the wireless communication node, a capability of the wireless communication device. Whether the UE supports 2 antenna ports codebook and/or 4 antenna ports codebook can be based on UE capability. If the UE reports the capability (e.g., of supporting a certain number of TPMI fields), the gNB can indicate the codebook(s) with several TPMI fields. In some embodiments, the wireless communication device receives, from a wireless communication node, the signaling, the signaling configured according to the capability of the wireless communication device. In some implementations, the capability includes at least one of a number of antenna ports in one antenna port group, a number of antenna port groups, indexes of the antenna ports, indexes of antenna port groups, a combination of antenna port groups, or a rank number in each antenna port group. In some embodiments, the wireless communication device reports its capability of supporting at least one of a type B codebook or a type C codebook.

Figure 6:
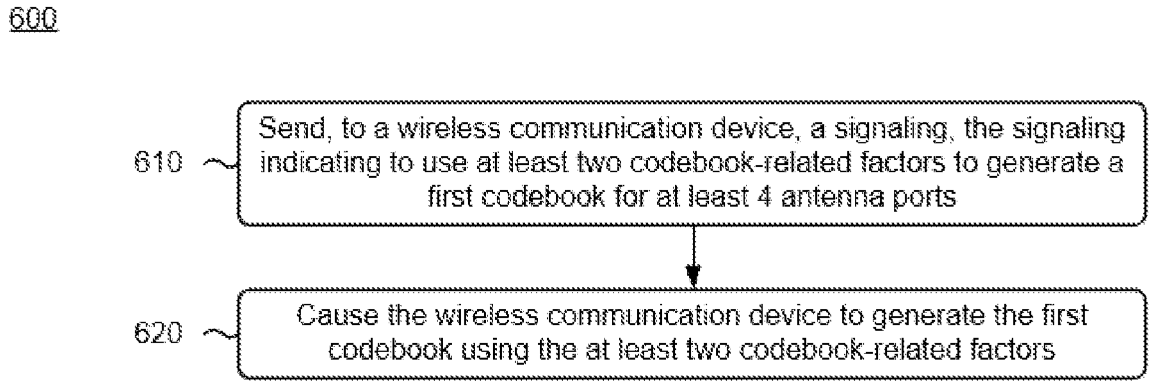
FIG. 6 illustrates a method for sending signaling indicating codebook-related factors, in accordance with some embodiments.

FIG. 6 illustrates a method 600 for sending signaling indicating codebook-related factors, in accordance with some embodiments. Referring to FIGS. 1-4, the method 600 can be performed by a wireless communication device (e.g., a UE) and/or a wireless communication node (e.g., base station, a gNB), in some embodiments. Additional, fewer, or different operations may be performed in the method 600 depending on the embodiment. One or more operations or embodiments/implementations/aspects/examples of method 600 may be combined with one or more operations or embodiments of method 500.

In brief overview, in some embodiments, a wireless communication node sends, to a wireless communication device, a signaling, the signaling indicating to use at least two codebook-related factors to generate a first codebook for at least 4 antenna ports (operation 610). In some embodiments, the wireless communication node causes the wireless communication device to generate the first codebook using the at least two codebook-related factors (operation 620).

In more detail, at operation 610, in some embodiments, a wireless communication node sends, to a wireless communication device, a signaling, the signaling indicating to use at least two codebook-related factors to generate a first codebook for at least 4 antenna ports. In some embodiments, the wireless communication device is a UE and the wireless communication node is a base station. In some embodiments, the signaling is RRC signaling. For example, the codebook for the each of the cases of 4+4, 4+2+2, 2+4+2, 2+2+4, and 2+2+2+2 can be configured in the RRC signaling, 3 bits can be used to indicate which mode is used, and the TPMI (e.g., each TPMI) indicates the codebook of 4 antenna ports or 2 antenna ports.

At operation 620, in some embodiments, the wireless communication node causes the wireless communication device to generate the first codebook using the at least two codebook-related factors. In some embodiments, the codebook includes at least one of a codebook for 1 antenna port, a codebook for 2 antenna ports, a codebook for 4 antenna ports, a vector having at least one element with a value of 1, a matrix having at least one element with a value of 1, or a diagonal matrix.

Figure 7:
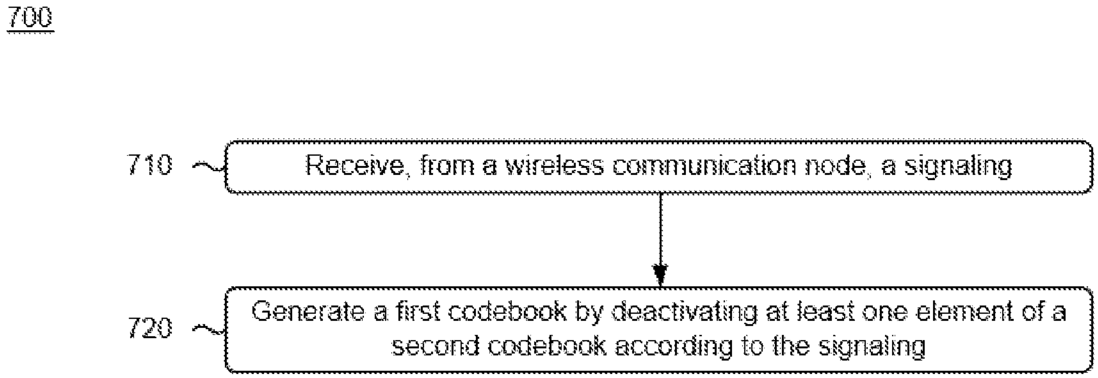
FIG. 7 illustrates a method for generating a codebook, in accordance with some embodiments.

FIG. 7 illustrates a method 700 for generating a codebook, in accordance with some embodiments. Referring to FIGS. 1-4, the method 700 can be performed by a wireless communication device (e.g., a UE) and/or a wireless communication node (e.g., base station, a gNB), in some embodiments. Additional, fewer, or different operations may be performed in the method 700 depending on the embodiment. One or more operations or embodiments of method 700 may be combined with one or more operations or embodiments/implementations/aspects/examples of one or more of method 500 or method 600.

In brief overview, in some embodiments, a wireless communication device receives, from a wireless communication node, a signaling (operation 710). In some embodiments, the wireless communication device generates a first codebook by deactivating at least one element of a second codebook according to the signaling (operation 720).

In more detail, at operation 710, in some embodiments, a wireless communication device receives, from a wireless communication node, a signaling. In some embodiments, the wireless communication device is a UE and the wireless communication node is a base station. In some embodiments, the signaling is RRC or DCI signaling.

At operation 720, in some embodiments, the wireless communication device generates a first (e.g., partially coherent) codebook by deactivating at least one element of a second (e.g., fully coherent) codebook in each rank according to the signaling. Deactivating the at least one element may include setting the element to '0'. In some implementations, at least one of the second codebook includes at least one element of '0' in each rank or the first codebook includes no element of '0'.

In some embodiments, the wireless communication device generates the second codebook for more than 4 antenna ports (e.g., 8 antenna ports), using a first discrete Fourier transform (DFT) vector ($u_1$) for a first dimension (e.g., a first polarized direction) and a second DFT vector ($v_1$) for a second dimension (e.g., a second polarized direction), wherein the first DFT vector is a first vector determined via DFT, and the second DFT vector is a second vector determined via DFT.

In some embodiments, the wireless communication device generates the second codebook using the first DFT vector, the second DFT vector, and phase information. In some aspects, the phase information includes at least one of a phase difference of the first dimension and the second dimension, a phase difference of different polarized antenna ports, or a phase difference of different transmission layers. In some implementations, the wireless communication device receives, from a wireless communication node, the signaling or another signaling, that includes at least one of the first DFT vector, the second DFT vector, and the phase information.

In some embodiments, the wireless communication device receives, from a wireless communication node, the signaling or another signaling, that indicates or identifies the second codebook.

In some embodiments, the wireless communication device receives, from a wireless communication node, the signaling (e.g., RRC), which includes at least one indication of which one or more elements (e.g., groups of antenna ports) of the second codebook are to be deactivated or activated. For example, for one layer transmission, {0} {1} can be configured (for each group of antenna ports or one combination of antenna port groups), and for 2 layers, {0,0},{0,1},{1,0},{1,1} is configured (for each group of antenna ports or one combination of antenna port groups). In some embodiments, the at least one indication is provided via a bitmap. In some implementations, each bit of the bitmap is associated with at least one of one group of coherent antenna ports or one antenna port or one combination of antenna port groups.

In some embodiments, the wireless communication device receives, from the wireless communication node, the signaling which includes downlink control information (DCI) that includes an indication of at least one configuration. In some implementations, each of the at least one configuration includes at least one factor. In some aspects, each factor indicating which one or more elements of the second codebook are to be deactivated or activated. The factor can include at least one of one value, one vector, or one matrix. In some aspects, each of the one or more elements is associated with at least one of one group of antenna ports or one antenna port or one combination of antenna port groups.

In some embodiments, which of the one or more elements is/are deactivated is according to user equipment (UE) capability. In some aspects, the UE capability includes at least one of a number of coherent antenna ports supported by the wireless communication device, indexes of the coherent antenna ports supported by the wireless communication device or one of a number of antenna ports in one antenna port group, a number of antenna port groups, indexes of the antenna ports, indexes of antenna port groups, a combination of antenna port groups, or a rank number in each antenna port group.

FIG. 8 illustrates a method 800 for sending signaling, in accordance with some embodiments. Referring to FIGS. 1-4, the method 800 can be performed by a wireless communication device (e.g., a UE) and/or a wireless communication node (e.g., base station, a gNB), in some embodiments. Additional, fewer, or different operations may be performed in the method 800 depending on the embodiment. One or more operations or embodiments of method 800 may be combined with one or more operations or embodiments/implementations/aspects/examples of one or more of methods 500-700.

In brief overview, in some embodiments, a wireless communication node sends, to a wireless communication device, a signaling (operation 810). In some embodiments, the wireless communication node causes the wireless communication device to generate a first codebook by deactivating at least one element of a second codebook according to the signaling (operation 820).

In more detail, at operation 810, in some embodiments, a wireless communication node sends, to a wireless communication device, a signaling. In some embodiments, the wireless communication device is a UE and the wireless communication node is a base station. In some embodiments, the signaling is RRC or DCI signaling.

At operation 820, in some embodiments, the wireless communication node causes the wireless communication device to generate a first codebook by deactivating at least one element of a second codebook according to the signaling. Deactivating the at least one element may include setting the element to '0'. In some implementations, at least one of the second codebook includes at least one element of '0' or the first codebook includes no element of '0'.

In some embodiments, a non-transitory computer readable medium storing instructions, which when executed by at least one processor, cause the at least one processor to perform any of the methods of 500-800 or corresponding embodiments. In some embodiments, at least one processor configured to perform any of the methods of 500-800 or corresponding embodiments.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method comprising:

receiving, by a wireless communication device from a wireless communication node, a signaling, the signaling indicating a first codebook that is generated using a second codebook, wherein the first codebook is for 8 antenna ports, and the second codebook comprises at least one of: a codebook for 2 antenna ports, or a codebook for 4 antenna ports, wherein the first codebook comprises a partially coherent codebook generated using the second codebook comprising a fully coherent codebook, wherein the partially coherent codebook is associated with a first subset of antenna ports belonging to a first coherent port group, and a second subset of antenna ports belonging to a second coherent port group, wherein a codebook mode is configured by radio resource control (RRC) signaling from the wireless communication node to the wireless communication device, the codebook mode including at least one of: a first mode in which two second codebooks are each associated with 4 antenna ports or a second mode in which four second codebooks are each associated with 2 antenna ports; and performing, by the wireless communication device, an uplink transmission according to the first codebook.

2. The method of claim 1, wherein none of elements of the second codebook is ‘0’.

3. The method of claim 1, wherein at least one of:

the partially coherent codebook is combined from codebooks associated with 4 or 2 antenna ports; or the first subset of antenna ports is used for the uplink transmission while the second subset is not used.

4. The method of claim 1, wherein the first codebook is associated with 4 groups of coherent antenna ports.

5. The method of claim 1, comprising:

sending, by the wireless communication device to the wireless communication node, a capability of the wireless communication device, wherein the capability includes an indication of at least one of:

whether the wireless communication device supports the second codebook of 2 antenna ports; or whether the wireless communication device supports the second codebook of 4 antenna ports.

6. The method of claim 5, wherein at least one of:

when the capability includes an indication that the wireless communication device supports the second codebook of 2 antenna ports, the wireless communication device supports combining four second codebooks of 2 antenna ports;

when the capability includes an indication that the wireless communication device supports the second codebook of 4 antenna ports, the wireless communication device supports combining two second codebooks of 4 antenna ports; or the first codebook, to be generated by combining four second codebooks of 2 antenna ports, or two second codebooks of 4 antenna ports, is configured via radio resource control (RRC) signaling.

7. The method of claim 1, wherein the second codebook to generate the first codebook, is determined according to a predefined configuration or a higher layer signaling.

8. The method of claim 1, wherein the partially coherent codebook for 8 antenna ports has the first subset of antenna ports belonging to the first coherent port group, three second subsets of antenna ports belonging to three second coherent port groups.

9. A method comprising:

sending, by a wireless communication node to a wireless communication device, a signaling, the signaling indicating a first codebook that is generated using a second codebook, wherein the first codebook is for 8 antenna ports, and the second codebook comprises at least one of: a codebook for 2 antenna ports, or a codebook for 4 antenna ports, wherein the first codebook comprises a partially coherent codebook generated using the second codebook comprising a fully coherent codebook, wherein the partially coherent codebook is associated with a first subset of antenna ports belonging to a first coherent port group, and a second subset of antenna ports belonging to a second coherent port group, wherein a codebook mode is configured by radio resource control (RRC) signaling from the wireless communication node to the wireless communication device, the codebook mode including at least one of: a first mode in which two second codebooks are each associated with 4 antenna ports or a second mode in which four second codebooks are each associated with 2 antenna ports; and receiving, by the wireless communication node from the wireless communication device, an uplink transmission according to the first codebook.

10. The method of claim 9, wherein the partially coherent codebook for 8 antenna ports has the first subset of antenna ports belonging to the first coherent port group, three second subsets of antenna ports belonging to three second coherent port groups.

11. The method of claim 9, wherein none of elements of the second codebook is ‘0’.

12. The method of claim 9, wherein at least one of:

the partially coherent codebook is combined from codebooks associated with 4 or 2 antenna ports; or the first subset of antenna ports is used for the uplink transmission while the second subset is not used.

13. The method of claim 9, wherein the first codebook is associated with 4 groups of coherent antenna ports.

14. The method of claim 9, further comprising receiving, by the wireless communication node from the wireless communication device, a capability of the wireless communication device, wherein the capability includes an indication of at least one of:

whether the wireless communication device supports the second codebook of 2 antenna ports; or whether the wireless communication device supports the second codebook of 4 antenna ports.

15. The method of claim 14, wherein at least one of:

when the capability includes an indication that the wireless communication device supports the second codebook of 2 antenna ports, the wireless communication device supports combining four second codebooks of 2 antenna ports;

when the capability includes an indication that the wireless communication device supports the second codebook of 4 antenna ports, the wireless communication device supports combining two second codebooks of 4 antenna ports; or the first codebook, to be generated by combining four second codebooks of 2 antenna ports, or two second codebooks of 4 antenna ports, is configured via radio resource control (RRC) signaling.

16. The method of claim 9, wherein the second codebook to generate the first codebook, is determined according to a predefined configuration or a higher layer signaling.

17. A wireless communication device, comprising:
at least one processor configured to:
receive, via a receiver from a wireless communication node, a signaling, the signaling indicating a first codebook that is generated using a second codebook,
wherein the first codebook is for 8 antenna ports, and the second codebook comprises at least one of: a codebook for 2 antenna ports, or a codebook for 4 antenna ports,
wherein the first codebook comprises a partially coherent codebook generated using the second codebook comprising a fully coherent codebook,
wherein the partially coherent codebook is associated with a first subset of antenna ports belonging to a first coherent port group, and a second subset of antenna ports belonging to a second coherent port group,
wherein a codebook mode is configured by radio resource control (RRC) signaling from the wireless communication node to the wireless communication device, the codebook mode including at least one of: a first mode in which two second codebooks are each associated with 4 antenna ports or a second mode in which four second codebooks are each associated with 2 antenna ports; and
perform an uplink transmission according to the first codebook.

18. A wireless communication node, comprising:
at least one processor configured to:
send, via a transmitter to a wireless communication device, a signaling, the signaling indicating a first codebook that is generated using a second codebook,
wherein the first codebook is for 8 antenna ports, and the second codebook comprises at least one of: a codebook for 2 antenna ports, or a codebook for 4 antenna ports,
wherein the first codebook comprises a partially coherent codebook generated using the second codebook comprising a fully coherent codebook,
wherein the partially coherent codebook is associated with a first subset of antenna ports belonging to a first coherent port group, and a second subset of antenna ports belonging to a second coherent port group,
wherein a codebook mode is configured by radio resource control (RRC) signaling from the wireless communication node to the wireless communication device, the codebook mode including at least one of: a first mode in which two second codebooks are each associated with 4 antenna ports or a second mode in which four second codebooks are each associated with 2 antenna ports; and
receive, via a receiver from the wireless communication device, an uplink transmission according to the first codebook.

* * * * *